Dec. 16, 1969  JYUNICHI GOTO  3,484,245

METHOD OF MAKING PURE BREW OF COFFEE

Filed Nov. 12, 1965

INVENTOR.
JYUNICHI GOTO

BY
Wenderoth, Lind & Ponack
Attorneys

United States Patent Office 3,484,245
Patented Dec. 16, 1969

3,484,245
METHOD OF MAKING PURE BREW OF COFFEE
Jyunichi Goto, 519 Ohmiya, Fujimiya, Japan
Filed Nov. 12, 1965, Ser. No. 507,402
Int. Cl. A23f *1/08*
U.S. Cl. 99—71                                        4 Claims

ABSTRACT OF THE DISCLOSURE

A method of making a pure brew of coffee free from impurities by pouring boiling water onto coffee placed in an open top vessel having a reclosable opening on the bottom thereof. The boiling water is held in the vessel for several minutes, and then the bottom opening is opened to collect the coffee liquor in a container therebelow.

---

The present invention relates to coffee drink, and more particularly, to a pure coffee drink free from any contaminant or impurity which will deteriorate an inherent taste thereof heretofore unknown and an improved method of making the same by brewing freshly roasted and ground coffee.

The pure coffee drink obtained by the improved brewing method of this invention means a very good coffee drink produced by separating the contaminants or impurities resulting from a severe impact or friction of conventional coffee mills and characterized in that it is clear, of high aroma as well as of good taste which will never change on cooling and free from indigestive substances.

As is well known, the manufacture of coffee drink requires three steps: (1) roasting, (2) grinding, and (3) brewing or extracting. In order to effect a complete and satisfactory brewing step, we should know every phenomenon in connection with the above steps, roasting and grinding.

Based on an extensive research conducted on the current first and second steps, I have found that there exist several reasons and causes to degrade the inherent aroma and taste of coffee drink.

It is known that an old roasting process was carried out in an earthen ware by manual stirring, then the earthen ware was replaced by a manually revolving iron vessel fired by charcoal with a view to effecting a uniform roasting.

With the recent development of science, a roasting process with a hot air by an electrically driven stirring is performed so as to produce a satisfactory uniform roasting. The coffee beans are roasted to a temperature of 180° to 200° C., expand by about 70–75% compared to the raw ones, its moisture evaporates to a large degree leaving about 4–5%, and a fatty substance exudes over the surface including the core thereof. The roasting step is over with a particular crack noise as a finish signal, then the roasted coffee is removed from the roaster, cooled rapidly, and constricted itself to become one grown by 60–65% compared to the raw.

For the purpose of finding out how the roasting process affects coffee brewing, a group of whole coffee beans (not ground) is boiled in an amount of hot water for a period of three minutes to obtain a coffee brew sample, which is placed in a container. Then, the same group of coffee beans is again boiled in the same amount of another hot water for the same period of three minutes to obtain another coffee brew, which is placed in a second container.

Looking into the above two kinds of coffee brew, it is seen that the former looks like a light orange color, contains finely divided beans peeled off the surface thereof by the action of hot water, and a fatty substance separated from the beans floats on the water level while, on the other hand, the latter solution looks like almost the same color, contains no finely divided bean at all, but fat floats. If we drink it, the former tastes bad, but the latter refreshing. When both are bottled and left for an extended period of time, it is found that the former becomes a little turbid while the latter clear.

What has made such a difference as above between the two solutions? I have reasoned that the former solution contains such reactive constituents as the fatty substance which exudes on the surface of each coffee bean during the roasting step, but tends to change itself, an oxide of superficial fat which may be probably produced by an electric charge resulting from impact and friction in the iron vessel in the course of roasting while stirring, and a group of finely divided beans peeled off the surface thereof. On the other hand, however, the latter solution contains another kind of fat which is believed to exude from the inner portion of a roasted coffee bean, and should be considered as a pure fat which has not been subjected to the electric charge. It seems that the above fatty substance subjected to electric charge will be one of the contaminants or impurities which will deteriorate the aroma and taste of coffee drink, therefore the above experiment based on an unground roasted whole bean has been conducted.

It is known that in reference to the chemical analysis of coffee stock, the coffee contains about 30–31% water soluble constituents, but it seems water soluble constituents are very scarce on the surface of coffee bean. As a good solution of coffee suitable for drink cannot be produced by brewing an unground whole coffee bean in hot water, it has been determined that grinding of the beans will achieve this.

In reference to the second step of grinding, coffee stock was ground manually by a stone mill in old times. Static electric charge never occurs in the grinding process by means of the stone mill. It is believed that either pressure or speed in the stone mill was ideal for coffee grinding. However, with the progress of time, a flour mill driven by a steam engine or an electric motor was developed, and quite recently, the present high efficient mill modified for coffee grinding with a high power, a high pressure, a high friction and a high speed has been available. While coffee grinding is carried out with a high efficiency at present, one has never noticed a great disadvantage resulting from it.

In reference to the coffee ground by the currently available high efficient coffee mill, even the one pulverized in the morning will not retain its aroma and taste for a short period of time till the evening, because oxidation proceeds. For the reasons referred above, I have made an extensive research, and with a view to improving the quality of coffee product, I have already obtained two U.S. patents, U.S. Pat. No. 3,039,704, entitled, "Granulating Apparatus," granted June 19, 1962 and No. 3,190,-572, "Coffee Granulating Apparatus," granted June 22, 1965, wherein I have disclosed that when the coffee beans have to pass between a pair of opposed steel rolls, static electricity occurs by friction and an amount of enzymes may probably come out of coffee cells destroyed by high pressure applied thereto, whereby enzymes are believed by applicant to enter the coffee solution, and further, when the temperature thereof comes to a temperature adapted for activity of enzymes, they become active to affect the inherent aroma and possibly the taste of coffee.

Lastly, the third step of brewing coffee comes to the front. It is known that coffee is brewed by the commonly accepted procedures: percolator, syphon and drip. Of these brewing methods, one of the common disadvantages in brewing coffee lies in an insufficient separation of contaminants or impurities referred above in connection with the two steps, i.e., the oxide of fat and the group of finely divided particles including fine fibrous substances and cells containing enzymes. These contaminants pass through filter paper or cloth currently available.

A coffee cell is so tiny that a cluster of about 500 ones is visible through the microscope. The coffee solution looks dark black because many tiny particles of fiber are present therein, which is an entirely different matter from a highly concentrated solution of coffee. It is known that the black coffee degrades its flavor as its cools, therefore coffee should be taken while hot. A cooled coffee drink is worthless because it has degraded aroma and taste. The currently accepted brewing procedures by means of percolator, syphon and drip introduced about 200–300 years ago should be now re-examined.

With the completion of a novel coffee grinding "Kasai" process disclosed in my two U.S. patents, the present invention now contemplates to overcome the above disadvantage of the conventional brewing procedure in connection with the third step, whereby a good coffee drink is obtained by separating contaminants or impurities completely from a mother liquor of coffee produced by brewing roasted and ground coffee in hot water, and the coffee drink is clear, of high aroma as well as of good taste which will never change on cooling contrary to expectation, and free from indigestive substances, yet can be stored as a drink for an extended period of time.

Accordingly, it is a prinicpal object of the invention to provide a novel and improved coffee brewing process, whereby contaminants or impurities are separated completely from the coffee solution containing them to obtain a good coffee drink which retains its aroma as well as taste for an extended period of time after cooling.

It is another object of the invention to provide a novel coffee brewing apparatus of simple and convenient construction by which a novel brewing process can be performed.

It is an additional object of the invention to provide a brewing process as well as an apparatus therefor in which not only several cups of coffee but also hundred ones can be served as well.

These and other objects and advantages of the invention will become apparent to those skilled in the art from the following detailed description in connection with the accompanying drawings in which.

Figure 3:
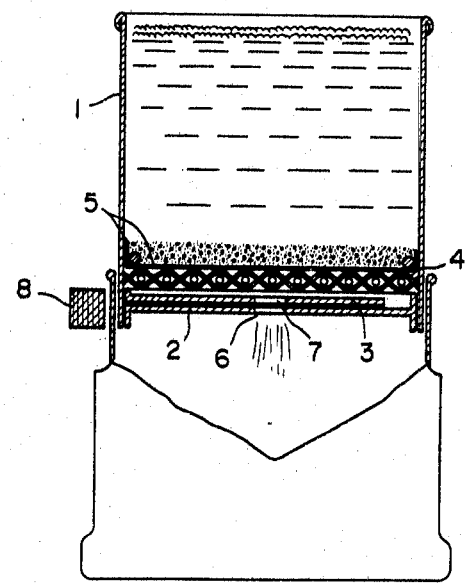

FIG. 3 is a side view of the same apparatus in which a mixed layer consisting of fat oxide and finely divided beans separated from the coffee stock by the action of hot water together with bubbles and blowholes floats on the water level while a relatively heavy mass of already brewed beans deposits on the bottom of the apparatus vessel under which there is provided a container for collecting a pure brew of coffee.

Figure 4:
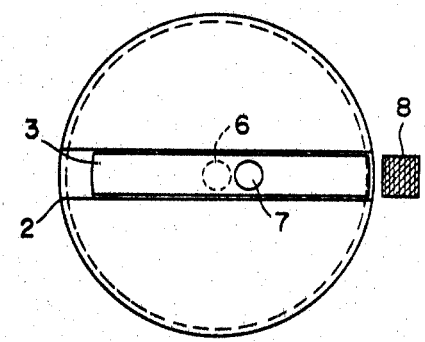

FIG. 4 is a plan view of the bottom of the apparatus vessel.

Figure 5:
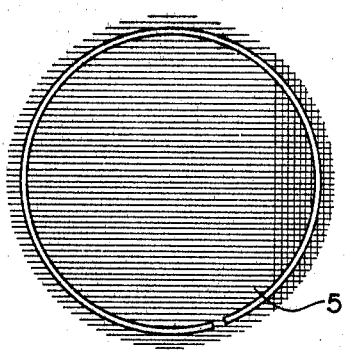

FIG. 5 shows a filter paper provided on the bottom of the vessel and a retaining non-ferrous metal ring therefor.

Before I describe the method of making a pure brew of coffee and apparatus therefor in accordance with my invention, I am going to indicate some disadvantages relating to the conventional process of making coffee, particularly, grinding it. It is known that present-day coffee grinding mills have been developed based on modern flour mills. However, I think the modern flour mills are not adapted for grinding roasted coffee beans in order to make good coffee, because the flour mill comprises a pair of opposed break rolls consisting of corrugated steel cylinders and the coffee mill comprises a similar construction consisting of a slow speed circumferentially ribbed roll and a high speed oppositely driven longitudinally ribbed roll wherein the coffee bean is subjected to cracking caused by dual friction, impact and speed difference, which occurs between opposed rolls, and all of the mills have been based on the principle of dual friction, therefore the occurrence of static electricity and destruction of cells are inevitable. At the same time, the fatty substance adhered to granulated coffee is oxidized by the chemical reaction resulting from the friction between the pair of opposed steel rolls.

Where the revolving speed of coffee mill is high, the cell of coffee bean is destroyed by impact, and the enzyme contained therein comes therefrom to mix into the mass of coffee granules. It is believed by applicant that when brewed with hot water, the enzyme passes through a filter paper to mix into a coffee solution, and it works in it at a temperature suitable for the activity thereof, which may tend to change the taste of coffee. In this respect, it seems it has been insufficient for the conventional coffee mill to conduct a thorough research on the nature of coffee.

The object of grinding food stock including not only coffee but also spices is to obtain the mass of coarse granules, not of fine particles. Hence it is absolutely necessary for the food grinding process to avoid friction as much as possible so as to eliminate static electricity caused by friction, and further, for the roll surface in contact with food stock to provide a non-ferrous metal which hardly gives rise to static electricity. At the same time, the point of application of force should be made of hard and smooth material so as to obviate the destruction of food cell and the dependent friction of ground product, which "Kasai" process is disclosed in my two U.S. patents. A Japanese word, "Kasai," is an abbreviation of a Japanese phrase, "each grain is divided at its center by a light strike as it spans as a bridge between two points," wherein a dry food stock is granulated between a pair of granulating rolls made of a bad conductive material for electricity, the surface of said rolls being provided with a plurality of circumferential ribs in the form of a triangle, the edge or point of each rib being hard, smooth and non-sharp, the size of each rib being smaller than each coffee bean, the edge of each rib on a roll of a pair of opposed rolls being staggered so as to lie between a pair of adjacent ribs on the opposed rolls being not in direct contact with each other, the two edges of two ribs of opposed rolls being spaced from each other, and each of said rolls being driven at the same speed in different directions. The Kasai method is characterized in that neither static electricity nor destruction of cells will take place during the same method.

The difference between the conventional ground product and the Kasai ground one is described as follows: the former changes color from its original roasted one to brown, being of non-sharp edge, having much fine powder, and its particle size being widely distributed while the latter hardly changes color, of sharp-edge, having no fine powder, and its particle size being uniform, the results of which and power consumption are listed hereinbelow:

|  | 40 mesh granule | 80 mesh granule | Power consumption |
| --- | --- | --- | --- |
| Kasai process | 1 | 1 | 1 |
| Conventional process | 3 | 20 | 5 |

However, it has been found in the Kasai method that when ground coffee at the top stage falls down to the second stage it is electrically charged only a little, and further, very fine powder is produced only a little so that oxidation takes place only a little, too.

Now, an extracted liquor of coffee, the object of this invention will be considered.

Three kinds of hot water brew, i.e., of roasted but unground coffee beans, of Kasai product of roasted ones, and of conventional ground product of the same, respectively, are made, the first liquor being produced by brewing for ten minutes, the second and third ones in a drip style, and bottled for 24 hours at 26–30° C., after which the three liquors have been examined: the first liquor is orange in color with almost the same hue, but with an oxidizing smell a little; the second liquor of Kasai product is blackish in color with no change of color together with no turbidity, but somewhat more smell of oxidizing than that of the first one; and the third liquor of ground product was black at first, but turned gray with a strong smell of oxidizing.

In reference to the cause of the above results of experiment, I think it is due to the influence of enzyme which, I believe, is contained in a plant seed. As is known, each enzyme is specific in its action and it usually acts on only one substance. Enzymes act when they are given water at an appropriate temperature. This temperature depends on specifics. In the plants, too, many enzymes are known to exist, and when a plant seed buds, it seems many enzymes act together. Of many enzymes, it seems there may exist an enzyme which will affect a water soluble substance, a cause or source of flavor or taste of coffee, and further, another substance, a cause or source of aroma. Fortunately, the enzyme seems to be contained in a cell of coffee bean, and it seems it may be neither volatile nor water soluble. When brewed in hot water, it seems the enzyme may not penetrate into a solution or it may not act. That the above liquor produced by brewing the conventional ground coffee in hot water has turned from black to gray in color during the period of 24 hours seems to be caused by the action of enzymes issued out of the cells destroyed by the severe impact and friction of conventional coffee mills, in other words, the enzymes penetrate into the coffee liquor through the filter paper or cloth and are believed by applicant to make it turbid through the action thereof at a suitable temperature therefor, I think.

In order to attempt to confirm the above theory, two kinds of hot water brew of roasted and ground coffee passing 40 mesh, and another coffee of coarse granules are made for comparison. It has been found that the former was rather good, but has become abominable in taste gradually and begun to appear turbid, too, at the temperature of about 55° C. in the course of cooling until entirely turbid at the temperature of 40° C., and finally become gray in color together with an oxidizing smell while, on the other hand, the latter liquor obtained from coarse granules remains good as well as aromatic after cooling, but becomes turbid a little. A variety of coffee products available in the market has been purchased for test, and it has been also found that it seems the enzymes issuing from the destroyed cells penetrate into the coffee liquor to a more or less degree, and besides, an amount of oxide of fat will be correspondingly increased.

Over the past years, it has been customary in making a cold drink of coffee, such as, coffee and milk, and cold coffee only, to roast the coffee beans to the maximum degree of carbonization. Why must coffee be roasted to such a degree? From my theory in connection with enzyme, it seems to be advantageous to make it to lose activity by roasting coffee up to the point immediately before carbonization. It is also very common with making a cold drink of coffee to put an ice cube into a container, and then pour a hot brewed liquor of coffee onto the ice. In applicant's opinion, this will reduce the time of an appropriate temperature for the believed enzyme activity.

In reference to a further progress of the bottled coffee liquor of Kasai product, while it looked clear after the period of 24 hours, it looks turbid a little after the period of additional five days with an oxidizing odor and a little settlings at the bottom of the container, which has been found unsuitable for drink. These settlings consist of finely divided substances which have passed the filter paper or cloth, and they seem to include the mass of destroyed cells. Therefore, it is considered that the enzymes come out of the destroyed cells to make the coffee liquor turbid.

On the contrary, however, it has been found that the conventional ground product of coffee contains a lot of finely divided substances which, it seems, include destroyed cells from which many enzymes issue, and these enzymes affect almost all of the water-soluble as well as aromatic substances.

After an extensive study of experiments, it has been found that in addition to the enzymes referred above, there exists an oxide of fat which deteriorates taste of coffee.

In reference to the known coffee brewing apparatus, a percolator is a coffee pot in which the boiling water repeatedly bubbles up through a tube and filters back to the bottom through the coffee grounds, which are held in a perforated container; a syphon type coffee pot is an apparatus in which the boiling water in the lower compartment rises up into the upper compartment to brew coffee and make the coffee liquor to fall down into the lower compartment so that finely divided substances together with oxide of fat are mixed into the liquor with no heed of separating them.

In the old times when coffee was a valuable food, it was an essential object to extract coffee with the boiling water as much as possible, hence no attention was paid to the contaminants or impurities which degrade coffee taste. While a filter paper or cloth is provided in a certain coffee pot, no other means is provided to separate the impurities from the coffee liquor.

Finely divided substances produced by the present day coffee mill can pass the filter paper or cloth currently available, and further, the oxide of fat which degrades coffee taste noticeably can pass it to mix into the liquor. It has been found that these finely divided substances and oxide of fat are indigestive or causing dyspepsia.

As is well known, coffee should be taken with flavor and taste while hot, and besides, it should not be taken too much, since it contains indigestive substances.

In reference to the aroma and the fat content of coffee, the comparison between those of a living plant and of a dead one has been studied, the results of which are described hereinbelow: it seems the aroma of living plant co-exists with a special type of fat. When a flower with a sweet smell was squeezed by a finger, a fat-like juice was produced and smeared, say, cotton cloth. When plant seed, such as, coffee bean, is roasted, it issues its own sweet smell, but it seems this odor does not co-exist with fat. To find out this fact, the coffee beans are roasted, then cooled immediately, packed into a paper bag, which is again wrapped up with a synthetic resin, say, vinyl bag, and remains in double packed state for the period of 24 hours. After the period of 24 hours, the aroma in the paper bag soon escapes. It has been found that the inner paper bag was smeared with the fat oozed from the roasted and ground coffee, but no smell issued therefrom.

Another experiment: the coffee liquor brewed by the drip method was immediately bottled and sealed for the period of 5 hours. On opening this bottle, the fat floats on the level of coffee liquor in it. The coffee aroma cannot be perceived from the fat when absorbed into the cotton, but we can perceive coffee flavor from the liquor.

While the roasted, thus dead coffee beans issue their aroma, they give forth it much more if ground, but this flavor will not be absorbed by anything and escape very soon. The escape of aroma is tested as follows: a coffee liquor brewed by the method of this invention in the absence of enzymes and poured into a container with no lid thereon loses its fragrance in a period of 10 hours. Another experiment: 20 bottles of the same coffee liquor sterilized by heating and sealed by crown caps, respectively, are made, 10 of them stand erect, and the other 10 lie horizontal wherein the coffee liquor fills the mouth of each bottle as packing. It has veen found:

One month later:

Aroma escapes a little in the erect bottles.
No aroma escapes in the horizontal bottles.

Three months later:

Aroma loses distinctly in the erect bottles.
No aroma escapes in the horizontal bottles.

From the above test, it seems aroma molecules are so tiny and small that they escape through even the crown cap seal. It is also seen that the aroma issuing from the dead plant seed does not co-exist with the fat.

There are some who assert that aroma is a fatty substance while others say it is unknown at all, be it the thing itself or its location. It is also unknown in the literature that there may be any difference between aroma of living things and that of dead ones. However, I have come to the conclusion that the aroma issuing from the dead seed, such as, coffee beans, can be separated from the fat of coffee liquor, and further, it will not be decreased even by separating the coffee fat and other impurities from its liquor.

As fully described in the foregoing, miscellaneous defects and disadvantages of known coffee mills and coffee pots have been disclosed in detail. In view of the above, the present invention contemplates to provide a novel and improved method of making pure brew of coffee and an apparatus therefor by overcoming the disadvantages referred above. Now, a preferred embodiment of this invention in connection with the accompanying drawing will be described in detail.

Figure 1:
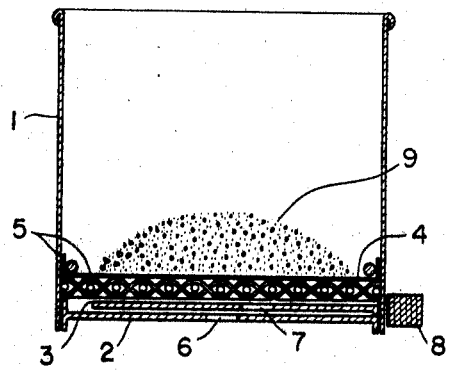
FIGURE 1 is a side view of the apparatus for carrying out a preferred embodiment of the invention in which coffee stock is placed at the bottom of the brewing apparatus prior to pouring of hot water.

Referring to FIG. 1, the coffee brewing apparatus in accordance with the principle of this invention comprises an open top cylindrical vessel 1 made of a non-ferrous metal material, a bottom plate 2 of a non-ferrous metal material, a sliding piece 3, a non-ferrous net 4, a filter paper 5 with a retaining ring, and a permanent magnet 8 located outside the vessel 1. The bottom plate 2 is provided with a narrow groove along the diameter thereof and this groove has an opening 6 of a suitable size on the center thereof. The width and depth of this groove is so preferred that the sliding piece 3 can be freely inserted in it and can also slide therealong. The sliding piece 3 should be made of magnetic material, such as, steel sheet coated with chromium, and have also an opening 7 at the center thereof. The width of the sliding piece 3 is slightly narrower than that of the groove, and the thickness thereof is somewhat thinner than the depth of the groove. The length of the sliding piece should be made shorter than that of groove by that of two times the opening 7 diameter. The groove and the sliding piece are so arranged that when one end of the sliding piece is attracted by the magnet 8 to slide to one extremity of the groove, the groove opening 6 coincides with the opening 7 of the sliding piece 3 to make an opening while when the other end of the piece 3 is attracted by the magnet to slide to the other extremity of the groove, the opening 6 of which is closed by the piece 3.

As described above, the groove and the sliding piece provided on the bottom of the brewing vessel in such a manner that the piece can freely slide in the groove right and left. In order to slide the piece in the groove right or left as desired, the permanent magnet 8 is located outside the vessel so that the piece can be moved right and left by the attraction thereof, which is one of the features of this invention. The permanent magnet 8 is so located that manual operation can move the sliding piece. It matters little where to place the magnet 8 as long as it is convenient near the vessel.

The brewing vessel of the invention is completed by inserting the sliding piece into the bottom groove of the vessel, placing a non-ferrous hard flat wire net thereon, and further, placing a filter paper on it with a retaining ring of non-ferrous metal material thereon.

The mesh of the above non-ferrous wire net is not limited, because this wire net supports the filter paper only. In addition, the mesh of filter paper may be of a known one adapted for coffee. It is seen that the filter cloth may replace the paper.

In operation, the novel and improved brewing method in accordance with the invention will be described. A predetermined quantity of roasted and ground coffee is put into the vessel with the groove opening 6 closed. Then, a predetermined quantity of boiling water at a temperature of 81°–95° C. is poured onto the coffee with a quick stirring so that the whole coffee is completely wet with the hot water.

Figure 2:
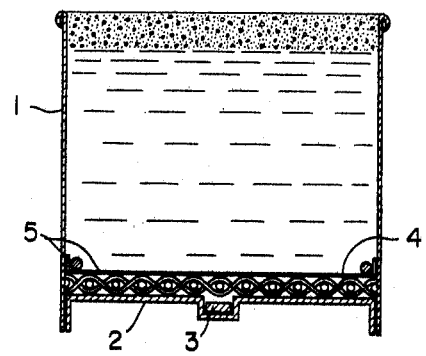
FIG. 2 is a side view of the same apparatus of FIG. 1 in which the coffee stock floats on the water level several seconds after the hot water has been poured thereinto.

On pouring the hot water, an amount of electric charged fat present on the surface of coffee coarse granules and other finely divided substances separate and float on the water level. At the same time, volatile molecules evolved from the inside of coffee cells float by the action of hot water in the form of bubbles and blowholes. At this time the layer of bubbles and blowholes forms on the water level while the whole coffee floats immediately below the water level with the formation of coarse granule layer and continuous evolution of bubbles and blowholes. On the hot water level, there exists a complex mixed layer consisting of fat separated from the surface of coarse granule to float, floating finely divided substances, innumerable bubbles and blowholes, and a very small quantity of dextrine together with the increase of surface tension of all the substances concerned, and further, immediately below the water level, innumerable coarse granules of various sizes of coffee float. Hot water exists under them, and at this time, no coffee remains on the bottom of the vessel as clearly shown in FIG. 2.

In this case, I have found the fact: in general it is considered that a finely divided substance loses its floating ability first of all in the boiling water owing to its rapid penetration; in fact, however, there are some finely divided substances which gain floating ability through the expansion of cells caused by the inner evaporation, and also some which do not grow up by the aid of blowholes owing to poor evaporation.

Water-soluble substances of coffee are dissolved in the hot water. The amber color of coffee liquor tends to change darker and darker. Approximately 5 seconds after the boiling water was poured, since the coffee solution is heavier than the hot water, it soon descends. After a period of 50–60 seconds, the mass of coarse granules begin to descend and deposit onto the filter paper on the bottom of the vessel in the form of layers of washed pebbles. When about 40–50% coarse granules become deposited onto the filter paper, it follows that an ideal filter together with the paper is obtained.

At this time, a mixed layer of almost all of fat oxide, finely divided substances, and blowholes still floats on the water level in the vessel, and moreover, many coffee granules which adhere to incompletely grown bubbles float, too. Small blowholes attached to coffee granules floating in the hot water are different from those on the water level, in other words, their surface tension is so weak that a slight tap on the vessel will remove blowholes from granules to let the latter fall down onto the bottom. Now, unoxidized fat begins to ooze from the coffee granules in the hot water. At this time, water-soluble substances are still being dissolved in the water. The temperature of the solution is much higher than that suitable for enzyme activity. This condition of liquor should preferably stay for a period of at least two to several minutes in order to make a pure brew of coffee. During this stay period no stirring should be kept in mind, because stirring will introduce the contaminants or impurities floating on the water level into the coffee solution. This stay time should be within ten minutes at the longest, because, if too long, impurities will be mixed.

After a suitable stay time, an operator or cook moves a permanent magnet 8 in his or her hand towards the vessel so as to attract the sliding piece 7 to slide to one extremity of the groove and let the bottom opening 6 coincide with the piece opening 7 to make an opening through which the coffee liquor is collected in the lower container as shown in FIG. 3. As the coffee liquor flows down through the bottom opening into the container, coffee dregs or grounds remain on the filter paper, and furthermore, the impurities floating on the water level deposit thereon, too, so that a desired pure brew of coffee is obtained.

Next, the method of making a pure brew of coffee in accordance with the invention will be described in connection with the following examples:

Example 1

Coffee product employed: Roasted and ground one by Kasai method.
Quantity: 100 grams.
Particle size: 10 mesh, a major part of 25-30 mesh, and 40 mesh less than about 5%.
Pouring time of boiling water (about 95° C.): 11 seconds.
Stay time: 3 minutes 50 seconds.
Collecting time: 2 minutes 10 seconds.
Total time: 6 minutes 11 seconds.
End temperature of liquor collected: 76° C.
Storage period in a bottle: 3 months.
(Neither color nor taste changes.)

Example 2

Coffee product employed: Roasted and ground by mortar method.
Quantity: 100 grams.
Particle size: 10 mesh, 30-35 mesh, and 40 mesh less than 20%.
Pouring time of boiling water: 11 seconds.
Stay time: 3 minutes.
Collecting time: 4 minutes 2 seconds.
Total time: 7 minutes 13 seconds.
Storage period in a bottle: About 20 days.

In the above examples, 100 grams of coffee are employed, but, if 1000 grams (10 times) are to be brewed at one time, a vessel having an area of 10 times and the same depth may be employed.

The coffee liquor obtained by the method of this invention is clear, of high aroma, refreshing, thick, free from indigestive substances, and can be stored in a sealed bottle for an extended period of time. It is particularly useful for making coffee milk (a major part of milk and a minor part of coffee) and cooled coffee, because no excess roasting of coffee beans as described hereinbefore is required.

The scope of the protection afforded the invention is not intended to be limited to the particular embodiment shown in the drawings and described above, but should be determined only in accordance with the appended claims.

What is claimed is:

1. A method of making a pure brew of Kasai type coffee free from indigestive fibrous substances, and finely divided substances of coffee cells including enzymes separated therefrom, said coffee having a clear appearance, high quality aroma with good flavorable taste after cooling, and being able to retain these characteristics while being stored in a sealed bottle for an extended period of time, comprising the steps of:
   (a) placing a predetermined amount of roasted ground coffee stock into an open topped non-ferrous, infusing container having an apertured base and a selectively operable and closeable aperture closing means in the bottom thereof; said ground coffee including grounds of varying coarseness with a majority of particles of 25-30 size mesh, and a minority of 10 and 40 size mesh, the latter constituting less than 5%;
   (b) supporting said ground coffee on a filter means within said container and disposed above said base aperture;
   (c) pouring hot water within the range of from 80°-95° C. into the container and onto the roasted ground coffee, with the aperture closing means in the container bottom being in closed condition; thereby suspending the coffee stock initially in floating condition on the upper level of the water;
   (d) retaining the hot water in the infusing container with the ground coffee stock for a predetermined period of time from two to ten minutes whereby the finely divided substances become dissolved in said water and the coffee grounds or dregs settle to the bottom on the filter means;
   (e) placing a second container beneath said first container; and
   (f) opening said aperture closing means beneath the filter and collecting a pure coffee brew in the second container placed therebeneath, while filtering out the coffee grounds, and other undesirable indigestive substances and impurities by said filter means to produce a pure brew of coffee having enhanced flavor characteristics.

2. A method as defined in claim 1 including the further step of utilizing the more coarse grounds of coffee stock as a part of the filtering means, and letting the ground coffee stock infuse with hot water only up to the time when 40% to 50% of the coarse coffee granules become deposited on the filter means at the bottom of the container prior to the opening of said container and collecting the brewed coffee in said second container.

3. A method as defined in claim 1 including the further steps of collecting the brew coffee into a non-ferrous bottle type container, hermetically sealing said container and aging by storing it on its side for a predetermined period of time up to three months prior to serving or drinking same.

4. A method as defined in claim 1 further including:
   (1) pouring said hot water of about 95° C. temperature over the ground coffee within a time period of about 11 seconds;
   (2) limiting the infusing of the hot water and coffee grounds within said first container to a period of about only three minutes and 50 seconds;
   (3) the collecting time of the brewed coffee into the second container being achieved in about 2 minutes and 10 seconds; and
   (4) limiting the total time for conducting the method to about 6 minutes and 11 seconds.

References Cited

UNITED STATES PATENTS 1,767,956    6/1930    Bachelder _____ 99—299 X

FOREIGN PATENTS 20,068    12/1900    Great Britain.

OTHER REFERENCES

Prescott, S. C.: "Report of An Investigation of Coffee," publ. by Joint Coffee Trade Publicity Committee, New York, pp. 28 to 31.

MAURICE W. GREENSTEIN, Primary Examiner

U.S. Cl. X.R.

99—299, 304